H. PEARL & C. F. REINMANN.
COVER FOR CULINARY VESSELS.
APPLICATION FILED APR. 23, 1909.
947,025.
Patented Jan. 18, 1910.
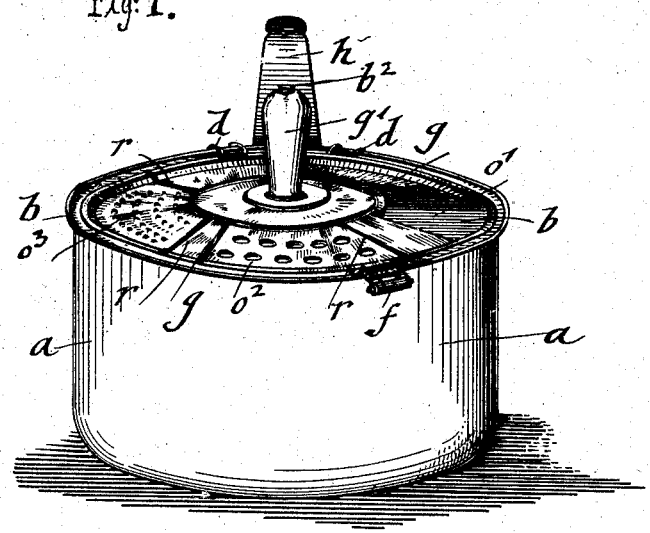
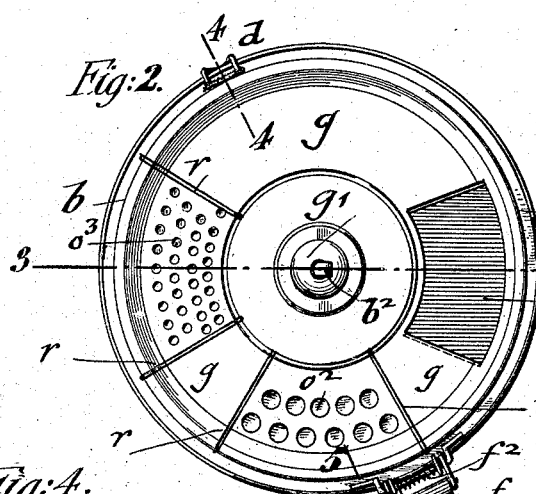
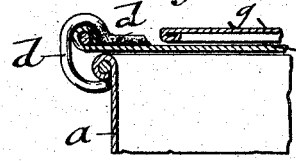
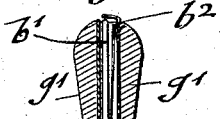
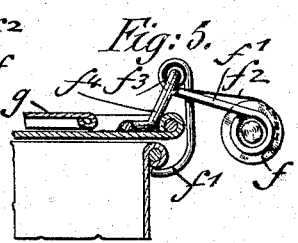
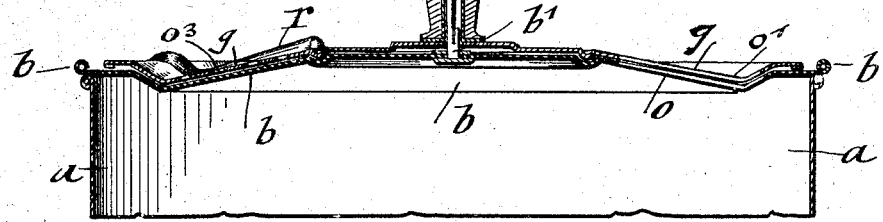
Witnesses
Inventors

UNITED STATES PATENT OFFICE.

HENRIETTA PEARL AND CHARLES F. REINMANN, OF NEW YORK, N. Y.

COVER FOR CULINARY VESSELS.

947,025.  Specification of Letters Patent.  Patented Jan. 18, 1910.

Application filed April 23, 1909. Serial No. 491,815.

*To all whom it may concern:*

Be it known that we, HENRIETTA PEARL and CHARLES F. REINMANN, both citizens of the United States of America, residing in New York, in the borough of Brooklyn, county of Kings, and State of New York, have invented certain new and useful Improvements in Covers for Culinary Vessels, of which the following is a specification.

This invention relates to an improved cover for culinary vessels which can be used as a strainer for soups, vegetables and the like, or for pouring off the hot water when boiling potatoes, and for other purposes connected with the cooking operations in the kitchens of restaurants, hotels, boarding houses and families generally; and for this purpose the invention consists of a cover for culinary vessels provided with a segmental opening and with means for attaching it to the rim of a vessel, and an axially rotatable strainer-plate provided with an opening registering with the opening of the cover, and also provided with a plurality of groups of larger and smaller openings, which can be placed over the opening in the cover as required for straining.

The cover is provided with a center-post and the strainer-plate with a perforated handle and means for locking the handle of the strainer-plate to the cover, said locking device permitting the release of the strainer from the cover for cleaning each part separately from the other.

The invention consists further of certain details of construction, which will be fully described and pointed out in the claims.

In the accompanying drawings, Figure 1 represents a perspective view of a culinary vessel with our improved cover shown in position thereon, Fig. 2 is a plan-view of the cover shown in Fig. 1, Fig. 3 is a vertical central section on line 3, 3, Fig. 2, drawn on a larger scale, and Figs. 4 and 5 are detail sections showing the means for attaching the cover to the culinary vessel, these figures being drawn on a still larger scale, and taken respectively on lines 4, 4, and 5, 5, Fig. 2.

Similar letters of reference indicate corresponding parts throughout the several views.

Referring to the drawings, $a$ represents a culinary vessel of any desired size, $b$ is the cover-plate which is made up in different diameters, according to the diameters of the culinary vessels with which the covers are to be used. The cover-plate $b$ is provided with a segmental opening $o$ of suitable size, and with means for attaching it to the rim of the vessel, the attaching means consisting of one or two stationary wire-hooks $d$ that are soldered or otherwise applied to the rim of the cover $b$, preferably one at each side of the handle $h$ of the vessel, said hook or hooks engaging the rim of the vessel $a$, as shown in Figs. 1 and 2. The cover-plate $b$ is provided at the point diametrically opposite to the wire hook or hooks with a spring-actuated handle $f$ the shank of which is provided with wire-hooks $f^1$ that engage the rim of the vessel and hold, in connection with the hook or hooks $d$, the cover firmly in position on the vessel. The handle $f$ is preferably formed of wood or other non-conducting material, so that the same can be readily taken hold of even when the cover is heated by the substance cooked in the vessel. The handle $f$ is pressed by means of a helical spring $f^2$ in downward direction so that the wire-hooks $f^1$ are pressed firmly against the rim of the vessel $a$, one end of the spring being attached to the rim of the cover, while the opposite end of the spring is attached to the handle, as shown clearly in Fig. 5. The supporting shanks of the handle $f$ are provided with eyes $f^3$ that turn on a fixed staple $f^4$ soldered to the rim of the cover $b$. The cover $b$ is provided with an annular depression near its rim, in which is fitted a correspondingly - depressed disk - shaped strainer-plate $g$, which is provided with a tubular handle $g^1$, which latter is retained by a catch-spring $b^2$ attached to the center-post $b^1$ of the cover, as shown clearly in Fig. 3. The strainer-plate $g$ can be turned on the center-post of the cover by taking hold of the handle $g^1$ and turning it on its axis. The strainer-plate $g$ is provided with a segmental opening $o^1$, which registers with the opening $o$ of the cover. In addition thereto, the strainer-plate is provided with two or more groups of perforations $o^2$, $o^3$, of larger and smaller size, as shown clearly in Figs. 1 and 2. When the opening $o^1$ of the strainer-plate $g$ is placed in register with the opening $o$ of the cover, the boiling water from potatoes or vegetables or other articles that are boiled in the vessel can be readily poured off; but when articles of smaller size are boiled, the surplus-liquid such as soup-stock and the like can be strained off through the groups of larger or smaller openings $o^2$, $o^3$, of which one or the other group is placed over the opening $o$ of the cover. While the vegetables or other contents of the vessel are subjected to boiling, the cover is closed by placing the non-perforated portion of the strainer-plate over the opening $o$ in the cover, so that the vapors are retained in the cooking vessel and prevented from escaping through the cover. Along each side of each group of perforations $o^2$ $o^3$ is arranged a radial rib $r$ by which the strained liquid is directed toward the circumference of the strainer-plate and cover and delivered into the receiving receptacle.

When the cover-plate is to be cleaned, the catch-spring $b^2$ is pressed inwardly, so as to release the tubular handle $g^1$, and remove the strainer-plate $g$ from the cover $b$, so that the cover and strainer-plate are detached from each other and can be separately cleaned and then replaced on top of each other for use.

As the cover can be arranged for cooking any substance that is to be cooked in the vessel, the liquid portion can either be poured off directly, or, in case of soup-stocks, gravies and the like, be strained through one of the groups of perforations $o^2$, $o^3$.

The cover forms thus a very useful and time-saving implement for culinary vessels of various kinds used in the kitchens of hotels, restaurants, boarding houses, etc.

The cover can be made up in plain sheet-metal, of any size and shape, or in enameled steel, and forms, when supplied in different sizes, a very useful attachment for culinary vessels of any kind.

Having thus described our invention, we claim as new and desire to secure by Letters Patent:

1. A cover for culinary vessels, comprising a cover-plate having an opening, a stationary center-post on said cover-plate, a retaining device carried by the center-post, a strainer-plate having an opening, groups of perforations and an unperforated portion adapted to register with said first-named opening, a hollow handle fixed to said strainer-plate and adapted to receive said post and to be engaged by said retaining device.

2. A cover for culinary vessels comprising a cover-plate having a segmental opening, a stationary center-post on said cover-plate provided with a retaining device, and a strainer-plate provided with a stationary handle having a tubular opening for being placed over the post and locked thereto by said retaining device or removed therefrom for separating the cover and strainer-plate for cleaning purposes.

3. A cover for culinary vessels, comprising a cover-plate having a segmental opening, a strainer-plate extending over the cover-plate and having a segmental opening, a group or groups of perforations of different sizes and a solid portion, radial ribs alongside of the perforated portions, and means for rotating the strainer-plate over the cover-plate for placing either one of the portions in register with the opening of the cover-plate.

In testimony, that we claim the foregoing as our invention, we have signed our names in presence of two subscribing witnesses.

HENRIETTA PEARL.
CHARLES F. REINMANN.

Witnesses:
PAUL GOEPEL,
H. J. SUHRBIER.